United States Patent [19] [11] 4,139,246
Mikoshiba et al. [45] Feb. 13, 1979

[54] VIBRATION CONTROL BUSH ASSEMBLY AND METHOD OF MAKING THE SAME

[75] Inventors: Shigeta Mikoshiba; Tomomichi Oishi, both of Toyota, Japan

[73] Assignee: Toyota Jidosha Kogyo Kabushiki Kaisha, Toyota, Japan

[21] Appl. No.: 787,999

[22] Filed: Apr. 15, 1977

[30] Foreign Application Priority Data

Apr. 17, 1976 [JP] Japan .............................. 51-48241[U]

[51] Int. Cl.² .............................................. F16C 27/06
[52] U.S. Cl. ................................... 308/26; 267/141.3; 280/673; 308/238; 403/227; 264/261; 267/57.1 R
[58] Field of Search ................ 308/238, 237, 26, 36.1; 267/57.1 R, 63 R; 280/673, 671, 716; 403/226, 227, 228, 267, 269, 265; 264/242, 261, 263; 29/149.5 R, 149.5 NM; 16/DIG. 33; 248/15, 22, 21, 26, 358 R, 374, 9

[56] References Cited

U.S. PATENT DOCUMENTS

| 3,322,475 | 5/1967 | Schick | 308/238 X |
| 3,411,803 | 11/1968 | Melton et al. | 308/238 X |
| 3,904,731 | 9/1975 | Orkin et al. | 308/238 X |
| 4,032,202 | 6/1977 | Ishikawa et al. | 308/238 |

Primary Examiner—Trygve M. Blix
Assistant Examiner—Douglas C. Butler
Attorney, Agent, or Firm—Stevens, Davis, Miller & Mosher

[57] ABSTRACT

The bush assembly for vibration control herein disclosed includes an inner cylinder, an annular stop member encircling the middle portion of the inner cylinder and an outer cylinder which is smaller in length than the inner cylinder. The outer cylinder coaxially encircles the inner cylinder and is radially spaced apart therefrom to define a cylindrical clearance space encircling the inner cyclinder. A generally cylindrical impact absorbing member of vulcanized rubber is secured in the cylindrical space by injection molding and a pair of washers are secured to the outer ends of the inner cylinder. The impact absorbing member has a thin portion encircling the stop member, thick portions on both sides thereof and a wide portion at the end of one of the thick portions, while the outer cylinder has large portions encircling the thick portions, a small portion encircling the thin portion and defining a certain clearance therebetween and a flange at the end of one of the large portions in the direction the wide portion is provided. Also disclosed is a method of making the bush assembly.

12 Claims, 14 Drawing Figures

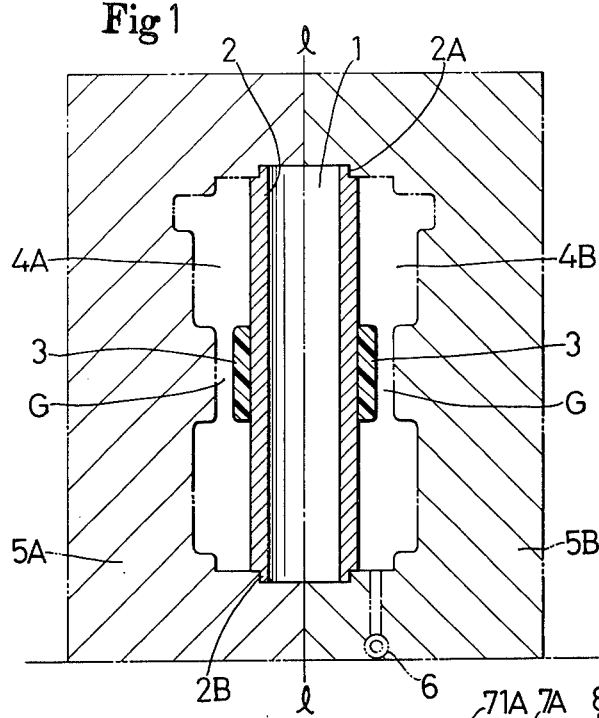
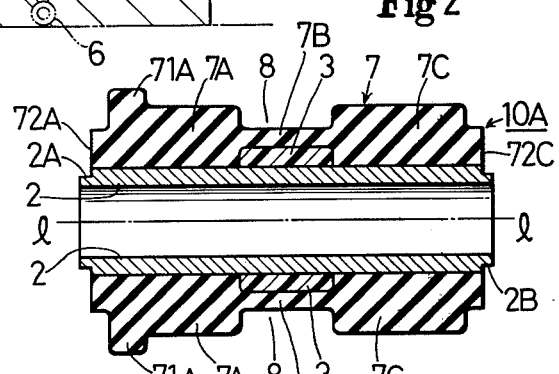
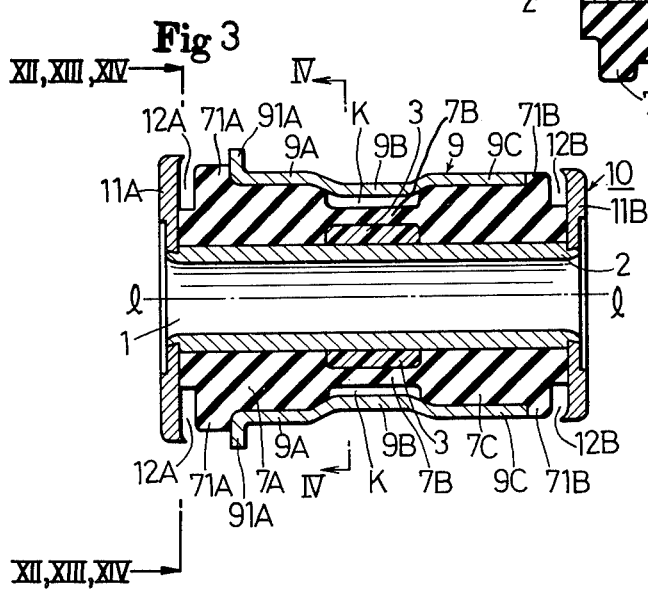
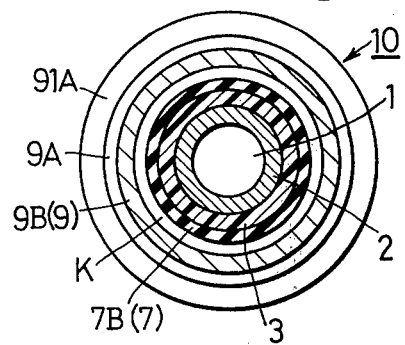

VIBRATION CONTROL BUSH ASSEMBLY AND METHOD OF MAKING THE SAME

This invention relates to a cylindrical bush assembly for vibration control, and more particularly, to a vibration control bush adapted for use with a suspension arm of a wishbone type suspension system of an automobile, which can dampen vibrations in the directions axially and transversely of the bush.

A bush used with a wishbone type suspension arm must be able to prevent transmission of vibration having a relatively small amplitude and a relatively high frequency caused by road irregularities from a wheel or wheels to the body of the automobile. It must also be capable of enduring repeated application of load having a relatively large amplitude and a relatively low frequency under hard conditions such as driving on a rough road. It must further be able to control vibration of the wheels without interfering with other parts or affecting the operation of the automobile.

In order to improve the vibration control capacity of such a bush, it must be designed so as to have a low spring rate or a greater deflection under a given load, with a resultant reduction in its durability. On the other hand, its durability can be improved only at the sacrifice of its vibration control capacity because its spring rate must be increased for that purpose. Thus, it has been desired to provide a bush having a non-linear spring rate which is low under a small load and high under a large load.

In an attempt to provide a solution to the problem, there has been proposed a bush of partly hollow wall construction intended for producing a non-linear spring rate. When applied to the wishbone type suspension system, the bush is subjected to vibration not only transversely but in the axial direction thereof. However, the spring rate of the bush in the axial direction is considerably lowered because of the partly hollow wall construction, and the bush fails to provide a desired spring rate and durability.

Thus, it has been difficult to obtain a bush which is satisfactory in both its vibration control capacity and durability within a limited dimensional range available for such a bush.

An object of the present invention is to provide an improved bush for vibration control having a non-linear spring rate in both axial and transverse directions characterized by a relatively large deflection in a small load range and a relatively small deflection in a large load range.

Another object of the present invention is to provide an improved bush for vibration control which is capable of effective vibration control over a reasonably long period of time for any particular application for which it is used.

Still another object of the present invention is to provide an improved bush for vibration control which can absorb axial and transverse torsions without lowering its spring rate.

Yet another object of the present invention is to provide a method of making a bush for vibration control having a non-linear spring rate in both axial and transverse directions.

These objects are attained by the present invention providing a cylindrical bush assembly for vibration control comprising an inner cylinder; an annular stop member encircling the middle portion of said inner cylinder; an outer cylinder coaxially encircling said inner cylinder and radially spaced apart therefrom to define a cylindrical clearance space encircling said inner cylinder, said inner cylinder being greater in length than said outer cylinder, said outer cylinder having a small diametrical portion encircling said stop member and a flange at one end thereof; a generally cylindrical impact absorbing member of vulcanized rubber having a smaller coefficient of elasticity than said stop member and secured in said cylindrical clearance space, said impact absorbing member having a thin portion encircling said stop member defining a clearance within said small diametrical portion and a wide portion adjacent to said flange; and a pair of washers secured to the ends of said inner cylinder.

The bush assembly of the present invention is made by a method comprising:
fitting an annular stop member to the middle portion of an inner cylinder to encircle the same; inserting said inner cylinder encircled by said stop member into a mold; injecting unvulcanized rubber into the cavity of said mold and vulcanizing the same to obtain a molding comprising an impact absorbing member of vulcanized rubber being somewhat smaller in length than said inner cylinder and having a thin portion encircling said stop member, thick portions on both sides thereof and a wide portion being greater in diameter than said thick portions and being adjacent one of said thick portions; fitting with said molding an outer cylinder being smaller in length than said inner cylinder and having two large portions encircling said thick portions, a small portion encircling said thin portion radially spaced apart therefrom to define a cylindrical clearance space encircling said thin portion and a flange being provided at the end of one of said large portions and being adjacent to one of said thick portions; and securing a pair of washers to the ends of said inner cylinder.

The bush assembly of the present invention is easy to manufacture because of the construction that the impact absorbing member is bonded to the inner cylinder by vulcanization and the outer cylinder encircles the impact absorbing member with an interference therebetween. The outer cylinder is provided with a small portion in the middle thereof to prevent it from slipping off by the load in the axial direction and to enable the bush assembly made compact.

The invention will now be described in further detail by way of example with reference to the accompanying drawings, in which:

FIG. 1 is a longitudinal cross sectional view of a mold wherein an inner cylinder encircled by a stop member is inserted;

FIG. 2 is a longitudinal cross-sectional view of a molding removed from the mold of FIG. 1;

FIG. 3 is a longitudinal cross-sectional view of a bush assembly of the present invention;

FIG. 4 is a cross-sectional view taken along the line IV — IV of FIG. 3;

Figure 5:
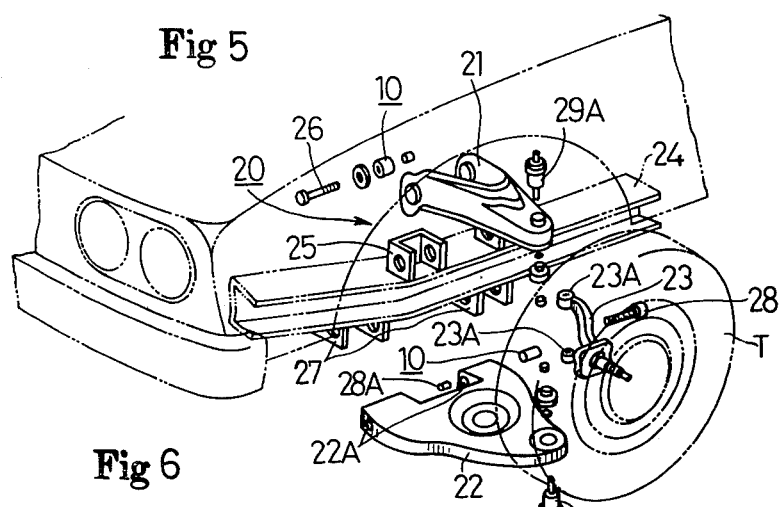
FIG. 5 is a fragmental perspective view of the front suspension arm of an automobile in which the bush of FIG. 3 is mounted.

Referring now to FIG. 1 of the drawings, there is shown an inner cylinder 2 which forms a bush assembly 10 of the present invention. The inner cylinder 2 includes an axial bore 1 therethrough having an axis defining the longitudinal axis l, and the ends 2A and 2B thereof are smaller in thickness than the other parts. The inner cylinder 2 is fitted at the middle portion thereof with an annular stop member 3 coaxially encircling the same. The stop member 3 is made of metal having large coefficient of elasticity or preferably of synthetic resin such as nylon, Teflon or Delrin (trademarks). The inner cylinder 2 fitted with the stop member 3 is inserted between two vertically symmetrical mold halves 5A and 5B to give a certain molding 10A as shown in FIG. 2.

The mold halves 5A and 5B are respectively provided with cavities 4A and 4B having half-cylindrical projections at their middle portions. The inner cylinder 2 is first inserted in the first half 5A in such a manner that the stop member 3 opposes the projection of the cavity 4A. Then the second half 5B is joined with the first half 5A so that the cavity 4B opposes the cavity 4A, and the two mold halves 5A and 5B are fixed to each other by a suitable means. Thereafter unvulcanized rubber is injected into the cavities 4A and 4B with a vulcanizing agent through an inlet 6 provided at the bottom of the second half 5B.

In the upper portions of the cavities 4A and 4B, there are provided vents (not shown), and between the projections of the cavities 4A and 4B and the outer surface of the stop member 3, there is formed a generally cylindrical clearance space G encircling the stop member 3. The cavities 4A and 4B are somewhat smaller in length than the inner cylinder 2.

The mold halves 5A and 5B are heated to a certain temperature to mold the unvulcanized rubber injected into the cavities 4A and 4B by vulcanization. Thereafter the mold halves 5A and 5B are removed to obtain a molding 10A wherein a generally cylindrical impact absorbing member 7 encircles the inner cylinder 2 and the stop member 3 by vulcanization. The cylindrical impact absorbing member 7 comprises a thin portion 7B encircling the stop member 3 and two thick portions 7A and 7C on both sides thereof. Between the thick portions 7A and 7C, there is formed an annular recess 8 encircling the thin portion 7B.

The thick portion 7A in the left in FIG. 2 has a wide portion 71A being greater in diameter than the other portions and a narrow portion 72A being smaller in diameter than the other portions. The other thick portion 7C is somewhat smaller in diameter than the thick portion 7A, and has a narrow portion 72C corresponding to the narrow portion 72A of the thick portion 7A (see FIG. 2).

Then an outer cylinder 9 is fitted with the molding 10A providing a certain interference between the outer cylinder 9 and the portions other than the wide portion 71A. The outer cylinder 9 comprises two large portions 9A and 9C having great diameters and being fitted with the thick portions 7A and 7C and a small portion 9B having a small diameter and being fitted in the recess 8 to give a certain clearance k encircling the recess 8. The outer cylinder 9 is somewhat smaller in length than the inner cylinder 2.

A flange 91A is provided in one end of the large portion 9A which is to fit with the wide portion 71A of the molding 10A. Since the large portions 9A and 9C provide an interference against the thick portions 7A and 7C, a part of the thick portion 7C swells at the end of the large portion 9C to form a wide portion 71B corresponding to the wide portion 71A (see FIG. 3). The large portion 9A is somewhat greater in inside diameter than the other large portion 9C.

After the outer cylinder 9 is fitted with the molding 10A, wahsers 11A and 11B are engaged with the ends 2A and 2B of the inner cylinder 2 to provide a bush assembly 10 of the present invention (see FIGS. 3 and 4).

In the bush assembly 10 of the present invention, there are provided two annular recesses 12A and 12B between the washers 11A and 11B and the wide portions 71A and 71B.

Attention is now directed to FIG. 5 illustrating a typical example of application of the vibration control bush assembly 10 according to this invention. FIG. 5 fragmentarily shows the wishbone type suspension system 20 of an automobile which includes an upper suspension arm 21, a lower suspension arm 22 and a steering knuckle 23 to which the front tire T is mounted. The upper suspension arm 21 is supported by a bracket 25 which is provided on a side frame 24 through a bolt 26 and the lower suspension arm 22 is supported by another bracket 27 which is provided under the side frame 24 through a bolt 28.

The ends 23A, 23A of the steering knuckle 23 are joined to the forward ends of the upper and lower suspension arms 21 and 22 through upper and lower ball joints 29A and 29B, respectively.

Figure 6:
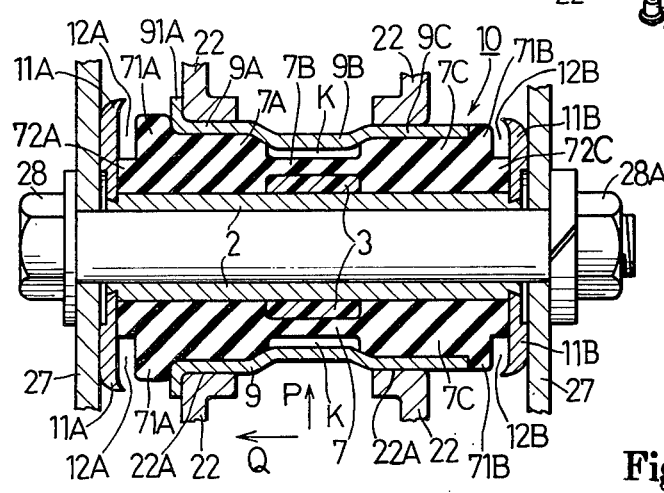
FIG. 6 is an enlarged longitudinal sectional view illustrating the bush applied to the lower suspension arm.

As shown in FIG. 6, the bush assembly 10 is, for example, inserted in one end 22A of the lower suspension arm 22, and a bolt 28 and a nut 28A tightening the bolt 28 against the bracket 27 provide a secure support for the end 22A and the bush assembly 10 mounted therein relative to the bracket 27.

A load bearing in a direction generally longitudinal of the automobile is transmitted to the longitudinal axis thereof. and the lower suspension arm 22 may be caused to move in the direction indicated by an arrow P in FIG. 6. The arm 22 displaces the outer cylinder 9 against the inner cylinder 2, and the load is absorbed by compression deformation of the thick portions 7A and 7C. If the load is further increased, the outer cylinder 9 is further displaced in the direction of the arrow P until the inner surface of the small portion 9B compresses the thin portion 7B against the stop member 3.

Since the material of the stop member 3 is greater in coefficient of elasticity than rubber, the stop member 3 is not easily deformed. Further, the stop member 3 has sufficient strength to absorb the impact caused by operation of the stop member 3.

Figure 7:
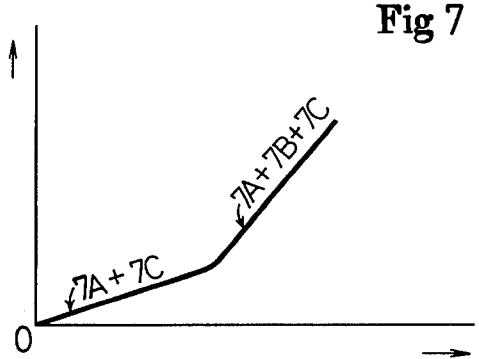
FIG. 7 is a graph showing a typical example of the spring rate obtained by the bush of FIG. 3.

FIG. 7 shows a graph showing a typical example of the spring rate obtained by the bush assembly 10. As shown in FIG. 7, the bush assembly 10 presents a non-linear spring rate, which is low with no operation of the stop member 3 under a small load and high with operation of the stop member 3 under a large load.

The lower suspension arm 22 may also be subjected to a load developed in the direction indicated by an arrow Q in FIG. 6 and is caused to move accordingly. The arm 22 displaces the outer cylinder 9 against the washer 11A, and the load is absorbed by compression deformation of the thick portion 7A at the shoulder between the large portion 9A and the small portion 9B. The thick portion 7A can easily be deformed because the annular recess 12A is formed between the wide portions 71A and the washer 11A. If the load is further increased, the outer cylinder 9 is further displaced in the direction of the arrow Q until the surface of the wide portion 71A contacts the washer 11A. After this contact, the load is absorbed by compression of the wide portion 71A between the flange 91A of the outer cylinder 9 and the washer 11A without any further deformation of the bush assembly 10.

Figure 9:
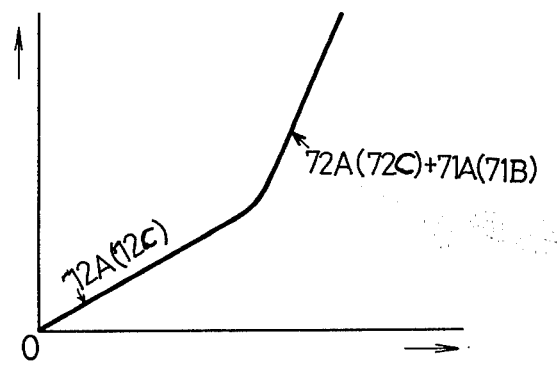
FIG. 9 is a graph showing an example of the spring rate obtained by the bush of FIG. 8.
Figure 11:
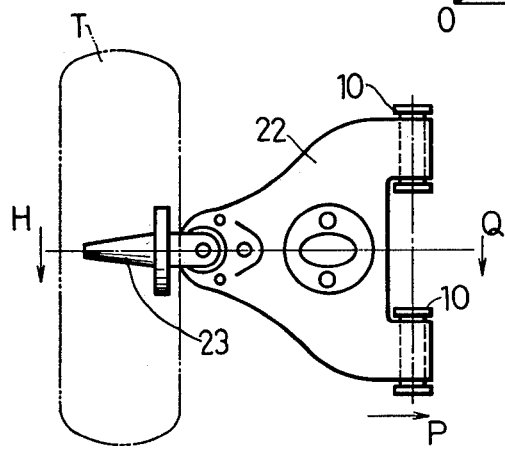
FIGS. 10 and 11 are diagrammatic illustrations showing the application of the load to the wheels caused by road irregularities.
Figure 10:
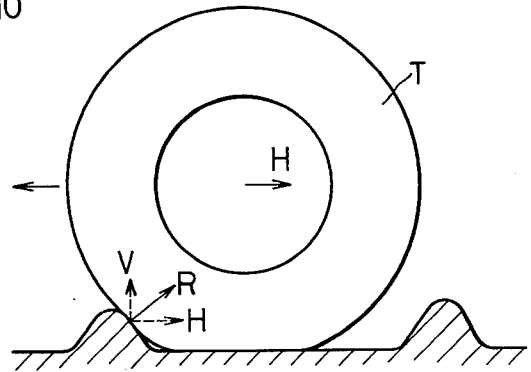

FIG. 9 shows a graph showing another example of the spring rate obtained by the bush assembly 10 against the load in the direction of the arrow Q. As shown in FIG. 9 which is similar to FIG. 7, the bush assembly 10 also presents a non-linear spring rate in this case, which is low under a small load and high under a large load.

Thus, the bush assembly 10 can absorb the load in the axial direction thereof by compression deformation of the thick portions 7A and 7C at the shoulders between the large portions 9A and 9C and the small portion 9B. In the transverse direction of the bush assembly, there is provided the clearance k to prevent lowering of the spring rate in the axial direction, and the spring rate in the axial direction is selective regardless of the spring rate in the transverse direction.

The load in the axial direction can not separate the outer cylinder 9 from the thick portions 7A and 7C. Further, the thin portion 7B has sufficient mechanical strength to absorb the impact caused by the operation of the stop member 3.

Figure 12:
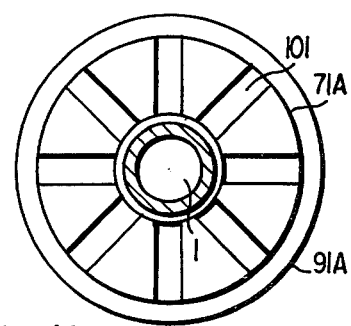
FIG. 12 is a view taken along line XII—XII of FIG. 3 showing an alternative embodiment having radial gouges in the end of the body.
Figures 13, 14:
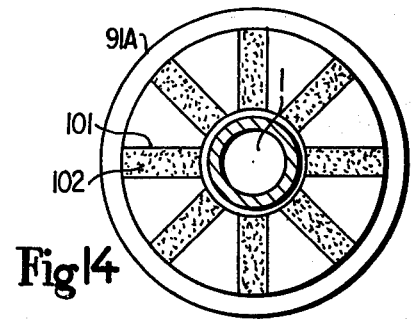
FIG. 13 is a view taken along line XIII—XIII of FIG. 3 showing an alternative embodiment having a soft material filling the annular space.
FIG. 14 is a view taken along line XIV—XIV of FIG. 3, similar to FIG. 12 but having a soft material filling the radial gouges.

Radial gouges 101 (see FIG. 12) can be provided between the wide portions 71A and 71B and the washers 11A and 11B in place of the annular recesses 12a and 12B to obtain a non-linear spring rate. Further, a soft material 102 (see FIG. 14) may be filled in said gouges or the annular recesses 12A and 12B (see FIG. 13) to prevent them from accumulating dust.

Figure 8:
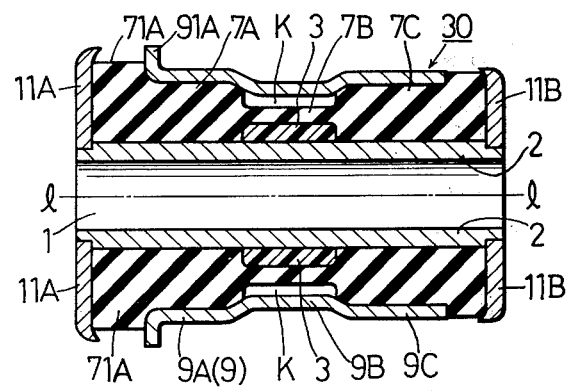
FIG. 8 is a longitudinal cross-sectional view of another embodiment of the bush assembly.

If it is not necessary to obtain a non-linear spring rate in the axial direction, the bush assembly 30 may be produced without annular recesses 12A and 12B as shown in FIG. 8.

As hereinabove described, the bush assembly 10 is inserted between the lower suspension arm 22 and the bracket 27. And when the automobile is being driven, the front tire T is subjected to a complex vibration indicated by an arrow R including an upward vibration indicated by an arrow V and a rearward vibration indicated by an arrow H and having relatively small amplitude and a relatively high frequency caused by road irregularities.

The upward vibration V of the front tire T is damped by cooperation of the bush assembly 10 and a suspension spring having relatively low spring rate (not shown) regardless of the spring rate of the bush assembly 10.

However, the rearward vibration H must be damped only by the bush assembly 10 applied to the upper suspension arm 21 or the lower suspension arm 22. The rearward vibration H is transmitted through the upper and lower ball joints 29A and 29B to the forward ends of the upper and lower suspension arms 21 and 22.

The input in the forward end of the upper suspension arm 21 is smaller than that of the lower suspension arm 22 since the upper ball joint 29A is longer in distance from the outer surface of the tire T than that of the lower ball joint 29B. Further, the load factor applied to the bush assembly 10 in the upper suspension arm 21 is smaller than that applied to the lower suspension arm 22 because of the geometrical relations between the upper and lower suspension arms 21 and 22. Thus, the bush assembly 10 applied in the upper suspension arm 21 affects the vibration control to a considerable degree.

Therefore, the bush assembly 10 of the present invention is preferably applied to the lower suspension arm 22. The rearward vibration of the forward end of the lower suspension arm 22 is absorbed by functions of the bush assembly 10 in both directions of the arrows P and Q. The spring rate of the bush assembly 10 in the direction of the arrow Q is generally substantially twice as much as that in the direction of the arrow P.

The bush applied to the front side of the lower suspension arm 22 is substantially twice as far in distance from the center shaft of the wheel as the bush applied to the rear side of the lower suspension arm 22, and the bush in the front side is deformed in relation to the bush in the rear side. Therefore, the spring function provided by rotation of the lower suspension arm 22 is about 50% of the entire spring function.

Since the bush assembly 10 presents a low spring rate under a small load, it can effectively prevent transmission of vibration from wheels to the body of the automobile which will cause noises such as road noise. Further, since the bush assembly 10 presents a high spring rate under a large load, it can effectively dampen vibration of wheels having a relatively high frequency caused by road irregularities to prevent interference with other parts and a handle shock with the function of the stop member 3 absorbing the load.

In case of cornering or braking of the automobile, the bush assembly 10 prevents the wheels from being seriously deformed so that the wheels are kept aligned with each other to maintain stability of the automobile.

The bush assembly 10 may also be used to dampen vibration in the direction of the arrow Q to obtain effective vibration control. In this case, the bush assembly 10 may be produced to present a linear spring rate.

While the invention has been described with reference to a preferred embodiment thereof, it is to be understood that modifications or variations may be easily made without departing from the scope of this invention which is defined by the appended claims.

We claim:

1. A cylindrical bush assembly for vibration control comprising an inner cylinder; an annular stop member encircling the middle portion of said inner cylinder; an outer cylinder coaxially encircling said inner cylinder and radially spaced apart therefrom to define a cylindrical clearance space encircling said inner cylinder, said inner cylinder being greater in length than said outer cylinder, said outer cylinder having a small diametrical portion encircling said stop member and a flange at one end thereof; a generally cylindrical impact absorbing member of vulcanized rubber having a smaller coefficient of elasticitiy than said stop member and secured in said cylindrical clearance space, said impact absorbing member having a thin portion encircling said stop member defining a clearance within said small diametrical portion and a wide portion adjacent to said flange; and a pair of washers secured to the ends of said inner cylinder.

2. The invention as defined in claim 1 wherein said stop member is made of metal or synthetic material having a greater coefficient of elasticity than said impact absorbing member.

3. The invention as defined in claim 1 wherein said impact absorbing member has annular recesses adjacent to the inner surfaces of said washers.

4. The invention as defined in claim 3 wherein said annular recesses are filled with soft material which wil not seriously affect the spring rate.

5. The invention as defined in claim 1 wherein said impact absorbing member has radial gouges adjacent to the inner surfaces of said washers.

6. The invention as defined in claim 5 wherein said radial gouges are filled with soft material which will not seriously affect the spring rate.

7. The invention as defined in claim 1 wherein said impact absorbing member has a first thick portion provided between said wide portion and said thin portion and a second thick portion separated from said first thick portion by said thin portion, said first thick portion being greater in diameter than said second thick portion, and the portion of said outer cylinder encircling said first thick portion is somewhat greater in inside diameter than the other portion encircling said second thick portion.

8. The invention as defined in claim 7 wherein said portion encircling said second thick portion is smaller in axial length than said second thick portion to thereby permit a part of said second thick portion to swell radially outwardly when said impact absorbing member is inserted into said outer cylinder.

9. A method of making a cylindrical bush assembly for vibration control comprising:
   fitting an annular stop member to the middle portion of an inner cylinder to encircle the same;
   inserting said inner cylinder encircled by said stop member into a mold;
   injecting unvulcanized rubber into the cavity of said mold and vulcanizing the same to obtain a molding comprising an impact absorbing member of vulcanized rubber being somewhat smaller in length than said inner cylinder and having a thin portion encircling said stop member, thick portions on both sides thereof and a wide portion being greater in diameter than said thick portions and being adjacent one of said thick portions;
   fitting with said molding an outer cylinder being smaller in length than said inner cylinder and having two large portions encircling said thick portions, a small portion encircling said thin portion and radially spaced apart therefrom to define a cylindrical clearance space encircling said thin portion and a flange being provided at the end of one of said large portions and being adjacent to one of said thick portions; and
   securing a pair of washers to the ends of said inner cylinder.

10. The method as defined in claim 9 wherein said unvulcanized rubber gets a smaller coefficient of elasticity than that of said stop member after being vulcanized.

11. The method as defined in claim 9 wherein said thick portions of said impact absorbing member are provided with annular recesses in the outer ends thereof adjacent said washers.

12. The method as defined in claim 9 wherein one of said thick portions having said wide portion is somewhat greater in diameter than the other thick portion.

* * * * *